(12) United States Patent
Sanin et al.

(10) Patent No.: US 8,560,495 B1
(45) Date of Patent: Oct. 15, 2013

(54) SYSTEM AND METHOD FOR SYNCHRONIZING MESSAGE PROCESSING IN A CONTINUOUS PROCESSING SYSTEM

(75) Inventors: Aleksey Sanin, Sunnyvale, CA (US); Ian D. Marshall, Sunnyvale, CA (US)

(73) Assignee: Sybase, Inc., Dublin, CA (US)

( * ) Notice: Subject to any disclaimer, the term of this patent is extended or adjusted under 35 U.S.C. 154(b) by 949 days.

(21) Appl. No.: 11/820,111

(22) Filed: Jun. 18, 2007

Related U.S. Application Data (60) Provisional application No. 60/819,302, filed on Jul. 7, 2006.

(51) Int. Cl.
*G06F 7/00* (2006.01)
*G06F 17/00* (2006.01)

(52) U.S. Cl.
USPC .................. 707/610; 707/620; 709/207

(58) Field of Classification Search
USPC .................................... 707/610, 620
See application file for complete search history.

(56) References Cited

U.S. PATENT DOCUMENTS

| | | | | |
|---|---|---|---|---|
| 5,615,363 A | * | 3/1997 | Jenness | 707/792 |
| 5,850,518 A | * | 12/1998 | Northrup | 709/203 |
| 6,279,034 B1 | * | 8/2001 | Jarriel et al. | 709/223 |
| 6,820,135 B1 | * | 11/2004 | Dingman et al. | 709/246 |
| 7,185,110 B2 | * | 2/2007 | De Jong | 709/245 |
| 7,313,810 B1 | * | 12/2007 | Bell et al. | 725/116 |
| 7,320,063 B1 | * | 1/2008 | Grohoski et al. | 712/214 |
| 7,383,253 B1 | | 6/2008 | Tsimelzon et al. | |
| 7,603,478 B2 | * | 10/2009 | Thurman et al. | 709/238 |
| 2003/0105620 A1 | * | 6/2003 | Bowen | 703/22 |
| 2004/0059436 A1 | * | 3/2004 | Anderson et al. | 700/2 |
| 2004/0130552 A1 | * | 7/2004 | Duluk et al. | 345/506 |
| 2004/0189669 A1 | * | 9/2004 | David et al. | 345/619 |
| 2005/0076113 A1 | * | 4/2005 | Klotz et al. | 709/224 |
| 2006/0265689 A1 | * | 11/2006 | Kuznetsov et al. | 717/117 |
| 2009/0064162 A1 | * | 3/2009 | Amin | 718/104 |

OTHER PUBLICATIONS

Beens E. "An introduction to distributed computer systems", Technische Universiteit Eindhoven, 1995.*
Beens, E "An introduction to distributed computer systems, a stoudy of Windows NT", Technische Universiteit Eindhoven, Oct. 1994-Aug. 1995.*
Fernandez et al., Achieving Predictable and Scalable Performance with BCS-MPI, MCYT, 2003.*
Co-pending Application, U.S. Appl. No. 11/346,119 inventors Tsimelzon, M., et al., filed on Feb. 2, 2006.

* cited by examiner

*Primary Examiner* — Daniel Kuddus
(74) *Attorney, Agent, or Firm* — Sterne, Kessler, Goldstein & Fox P.L.L.C.

(57) ABSTRACT

A system and method to synchronize the processing of messages in areas of an execution graph affected by primitives with potential for substantial delay is provided. A continuous processing system identifies primitives with potential for substantial delay. For each potentially-delayed primitive that is not in a loop, the continuous processing system creates a "timezone" downstream of such primitive. The output(s) of the potentially-delayed primitive is an input to the timezone. The continuous processing system then identifies all other inputs to the timezone and places a synchronizer across such inputs. In cases where the potentially-delayed primitive is within a loop, the timezone includes such primitive, as well all primitives downstream of such primitive.

33 Claims, 7 Drawing Sheets

SYSTEM AND METHOD FOR SYNCHRONIZING MESSAGE PROCESSING IN A CONTINUOUS PROCESSING SYSTEM

RELATED APPLICATIONS

This application claims the benefit of U.S. Provisional Application No. 60/819,302 filed on Jul. 7, 2006 with inventors Aleksey Sanin, Ian D. Marshall, and Giuliano Carlini and titled "DB Joiner and Passive Synchronizers: Real Query Processor 'Timezones,'" the contents of which are incorporated by reference as if fully disclosed herein.

BACKGROUND OF THE INVENTION

1. Field of the Invention

This invention relates generally to continuous processing systems that process streaming data, and, more specifically, to synchronizing message processing in a continuous processing system.

2. Description of the Background Art

A continuous processing system processes streaming data. It includes statements (such as queries), written by programmers, which operate continuously on input data streams and which publish to output data streams. In such system, it is often difficult to achieve predictable and repeatable output results.

When statements written by programmers are compiled, an execution graph may be created, where the execution graph is comprised of connected primitives that correspond to the compiled statements. An execution graph in a continuous processing system specifies the path for processing messages in accordance with the statements. In other words, the continuous processing system processes messages by pushing them through the execution graph.

In order to achieve predicable and repeatable output results, messages have to be processed in accordance with message order rules (i.e., rules that specify the order in which messages need to be processed). For example, in one embodiment, messages are assigned an internal timestamp and are processed in order of their timestamp, where messages with the same timestamp are processed together.

Certain types of primitives in an execution graph may have potential for substantial delay. Examples of such primitives include primitives that make database calls or remote procedure calls, as well as primitives associated with user-defined functions.

For efficiency and speed purposes, it is often desirable to process messages in parallel, which means that more than one row from a data stream may enter the execution graph at a particular time. With parallel processing, a primitive may process multiple messages with different timestamps at the same time. For example, a primitive that joins data in a message with data in a database (a "database joiner primitive" or "DB Joiner") may make concurrent database calls for multiple joins at once.

Figure 1:
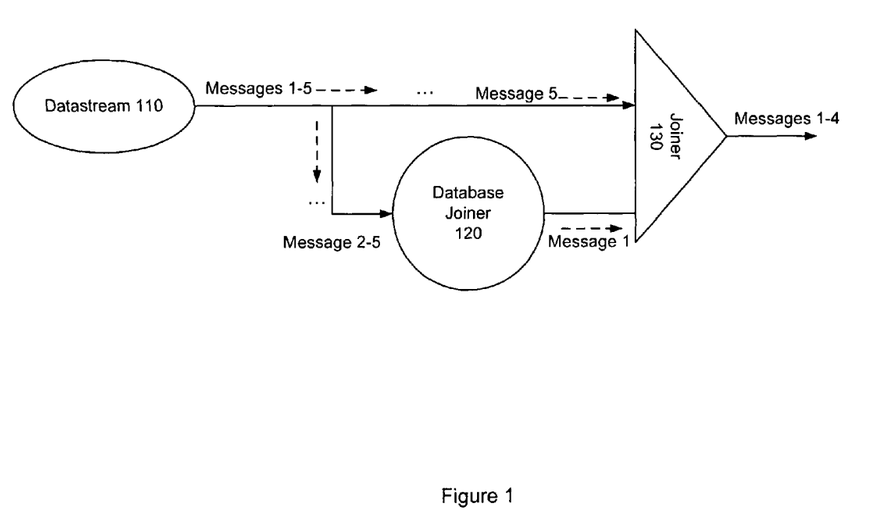
FIG. 1 is a block diagram that illustrates an example execution graph with parallel message processing.

If parallel processing occurs in a graph that has primitives with potential for substantial delay, messages can easily get processed out of order, which means that the output results will not be predictable and repeatable. FIG. 1 illustrates an example of this. In this example, messages from data stream 110 go into both database joiner 120 and joiner 130. Message order rules for this example system require that a message with timestamp x be joined at joiner 130 with output of database joiner 120 for a message with timestamp x (i.e., a message with the same timestamp). If only one message (i.e., one row) from data stream 110 goes into the execution graph at a time, the message order is easily preserved. However, if multiple messages enter the graph at once, messages could be processed out of order if one primitive is slower than the other primitive. In this example, messages with timestamps 1-5 go into the graph 100 and the database joiner 120 is delayed, thereby causing the output of the database joiner 120 for message 1 to be joined with message 5 in stream 110 instead of message 1 (where the correct result would be to join the output of the database joiner for message 1 with message 1).

Therefore, in an execution graph where there are primitives with the potential for substantial delay, there is a need for a system and method that permits parallel processing within some areas of the execution graph while protecting other areas of the graph from processing messages out of order due to primitives with potential for substantial delay.

BRIEF SUMMARY OF THE INVENTION

In cases where an execution graph in a continuous processing system includes primitives with potential for substantial delay, the present invention provides a system and method for synchronizing the processing of messages in areas of the execution graph affected by (i.e., dependent on) primitives with potential for substantial delay. The invention is especially useful in cases where it is desirable to be able to process messages with different internal timestamps in parallel (i.e., concurrently) in certain areas of the execution graph while maintaining serial processing in other areas. For instance, it enables a database joiner primitive to make concurrent calls to a database while still maintaining the proper order in which messages downstream of the database joiner should be processed.

In the present invention, the continuous processing system identifies primitives with potential for substantial delay. Primitives with potential for substantial delay can cause messages to be processed in an incorrect order when messages with different timestamps are in the execution graph at the same time.

For each potentially-delayed primitive that is not in a loop, the continuous processing system creates a "timezone" downstream of such primitive. A timezone is an area of the execution graph that, at any given time, includes only messages that need to be processed together (e.g., messages with the same internal timestamp). All primitives downstream of the potentially-delayed primitive are considered part of the timezone. The output(s) of the potentially-delayed primitive is an input to the timezone.

The continuous processing system then identifies all other inputs to the timezone and places a synchronizer across all inputs to the timezone. The synchronizer controls the flow of messages into the timezone to ensure that messages that need to be processed together enter the timezone at the same time. The synchronizer does not let additional messages into the timezone until the previously-entered messages have been processed by the timezone.

If a primitive with potential for substantial delay is part of a loop, then such primitive itself becomes part of the timezone, and a synchronizer is placed across all inputs to the timezone, including any feedback paths to the potentially-delayed primitive.

The use of timezones allows certain areas of the execution graph (i.e., areas outside the timezone) to process messages with different timestamps in parallel, while protecting other areas of the graph from processing messages out of order due to primitives with potential for substantial delay. Parallel processing of messages with different internal timestamps does not occur within a timezone.

DETAILED DESCRIPTION OF THE PREFERRED EMBODIMENTS

Figure 2:
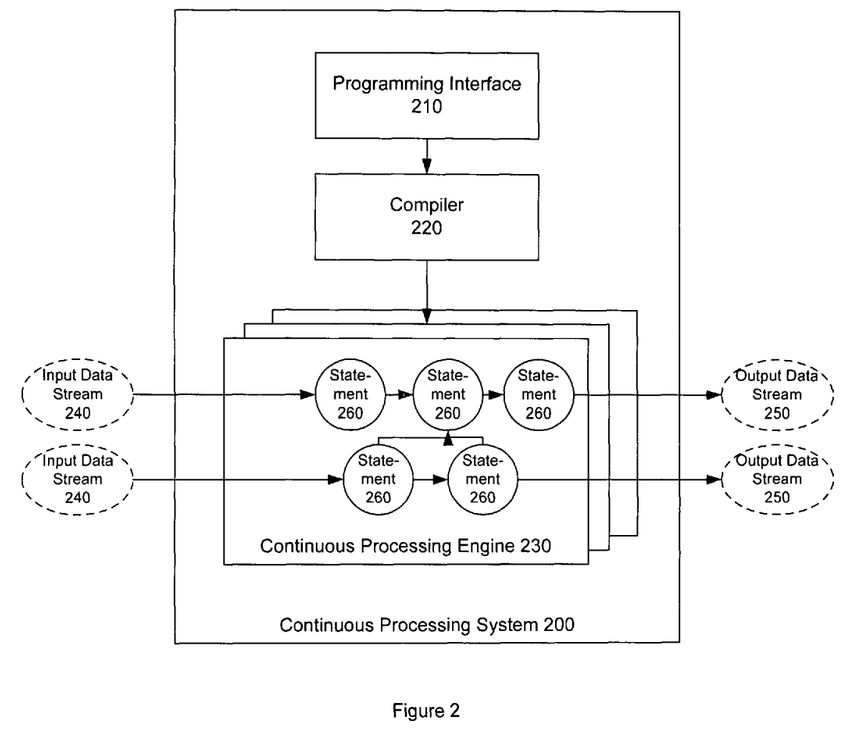
FIG. 2 is a block diagram that illustrates one embodiment of a continuous processing system.

FIG. 2 illustrates an example of a continuous processing system that processes streaming data. The system 200 includes a programming interface 210, a compiler 220, and a continuous processing engine 230, where the engine may be distributed over a cluster of servers. The programming interface 210 enables programmers to write statements 260 (such as queries), which are then complied by the compiler 220 and provided to the continuous processing engine 230.

A coherent sequence of statements is referred to as a "module." A module subscribes to one or more input data streams 240 and publishes to one or more output data streams 250. Through the engine 230, a module operates on input data streams continuously.

When the compiler 220 compiles a module, an execution graph is created for executing the module. The execution graph comprises a set of connected primitives, where the primitives correspond to statements in the module. (Note: Such correspondence is usually not a one-to-one correspondence.) Examples of primitives include filters, joiners, aggregators, and windows.

Coral8, Inc.'s "Complex Event Processing" engine is an example of a continuous processing system. Also, one embodiment of a continuous processing system is described in U.S. patent application Ser. No. 11/015,963, filed on Dec. 17, 2004 with Mark Tsimelzon as the first-named inventor, and titled "Publish and Subscribe Capable Continuous Query Processor for Real-time data streams," the contents of which are incorporated by reference as if fully disclosed herein.

Statements may be written in a continuous-processing software language (CPL), which is sometimes also referred to as a continuous correlation language (CCL). An example of such a language described in the U.S. patent application Ser. No. 11/346,119, filed on Feb. 2, 2006, and titled "Continuous Processing Language for Real-time Data Streams," the contents of which are incorporated by reference as if fully disclosed herein.

Figure 3:
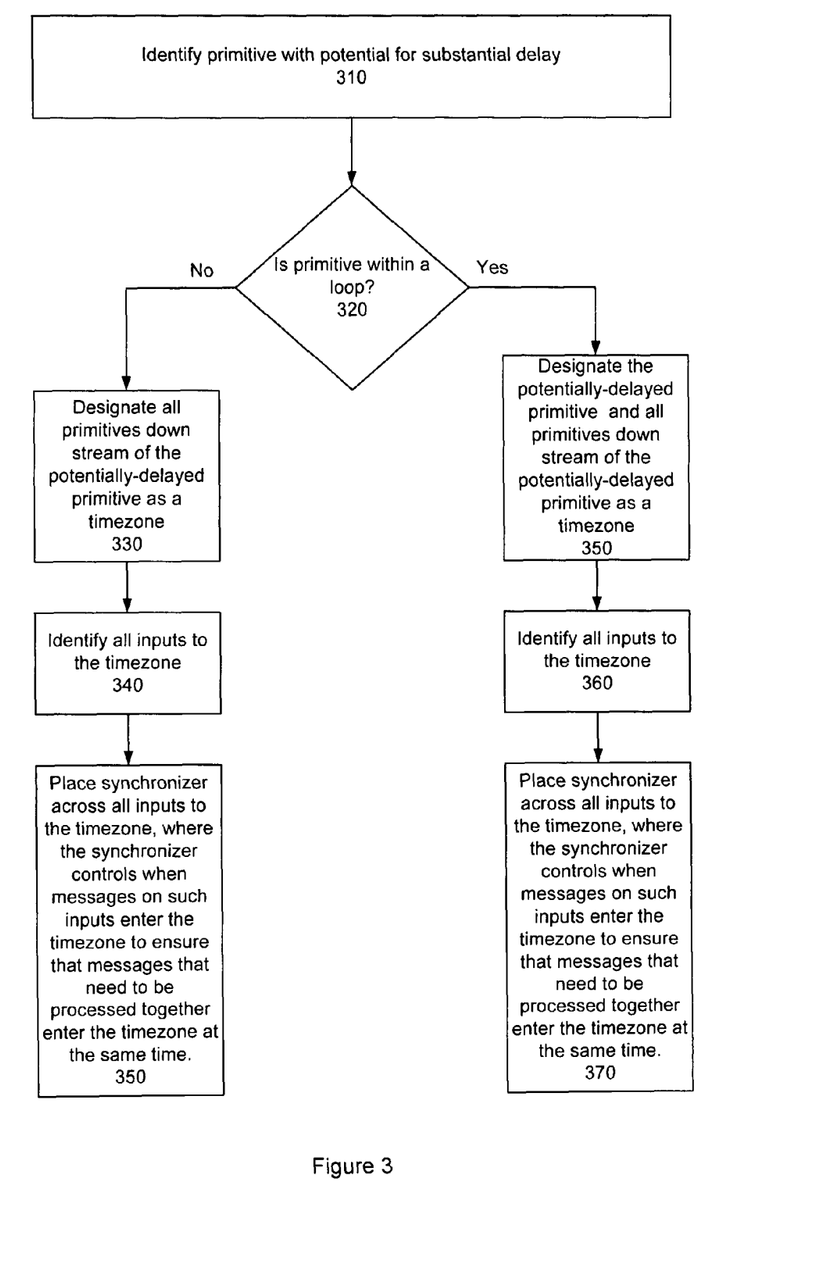
FIG. 3 is a flow chart that illustrates a method for synchronizing the processing of messages in areas of the execution graph affected by primitives with potential for substantial delay.

In cases where an execution graph in a continuous processing system includes primitives with potential for substantial delay, the present invention provides a system and method for synchronizing the processing of messages in areas of the execution graph affected by (i.e., dependent on) primitives with potential for substantial delay. FIG. 3 illustrates one embodiment of such method. In the preferred embodiment, the steps illustrated in FIG. 3 are performed by a compiler (e.g., compiler 220) in the continuous processing system, but the invention is in no way limited to the steps being performed by the compiler. The steps of FIG. 3 are described with reference to the example execution graphs in FIG. 4a-d.

In creating the execution graph, the compiler identifies primitives with potential for substantial delay (step 310). In one embodiment, the compiler has a hard-coded list of primitives with potential for substantial delay. Alternatively, the compiler may perform such identification based on rules or settings entered by a programmer or administrator for the continuous processing system. As stated above, examples of primitives with potential for substantial delay include database joiner primitives, primitives that make remote procedure calls, and primitives that are user-defined functions that can take substantial time to complete.

For each primitive with potential for substantial delay, the compiler determines whether such primitive is within a loop (step 320). For each such primitive that is not within a loop, the compiler designates all primitives downstream of such primitive as a "timezone" (step 330). The output(s) of the potentially-delayed primitive is an input to the timezone. A "timezone" is an area of the execution graph that, at any given time, only includes messages that need to be processed together. In one embodiment, this means that, at a given time, a timezone includes only messages with the same timestamp. Messages enter a timezone synchronously.

Figure 4A:
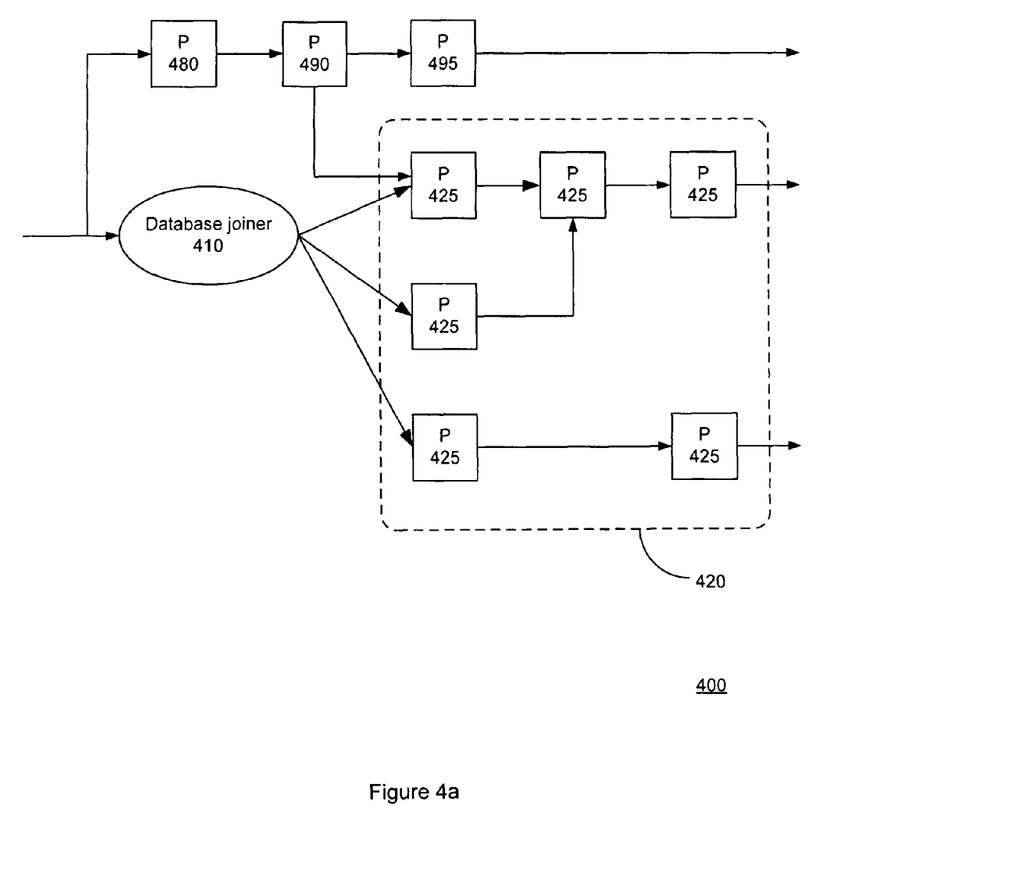
FIGS. 4a-d are block diagrams that illustrate example execution graphs.

In FIG. 4a, which illustrates an example execution graph, database joiner 410 is a primitive with potential for substantial delay. Therefore, in creating this execution graph 400, the compiler designates all primitives 425 downstream of database joiner 410 as being part of a timezone 420. The outputs of database joiner 410 are inputs to the timezone 420. "P" in FIGS. 4a-c stands for primitive.

The compiler then identifies all other inputs, if any, to the timezone that are in addition to the input(s) from the potentially-delayed primitive (step 340). The compiler places a synchronizer across all inputs to the timezone, where the synchronizer controls when messages on such inputs enter the timezone to ensure that messages that need to be processed together enter the timezone at the same time (step 350). The synchronizer does not let additional messages into the timezone until the previously-entered messages have been processed by the primitives in the timezone.

Figure 4B:
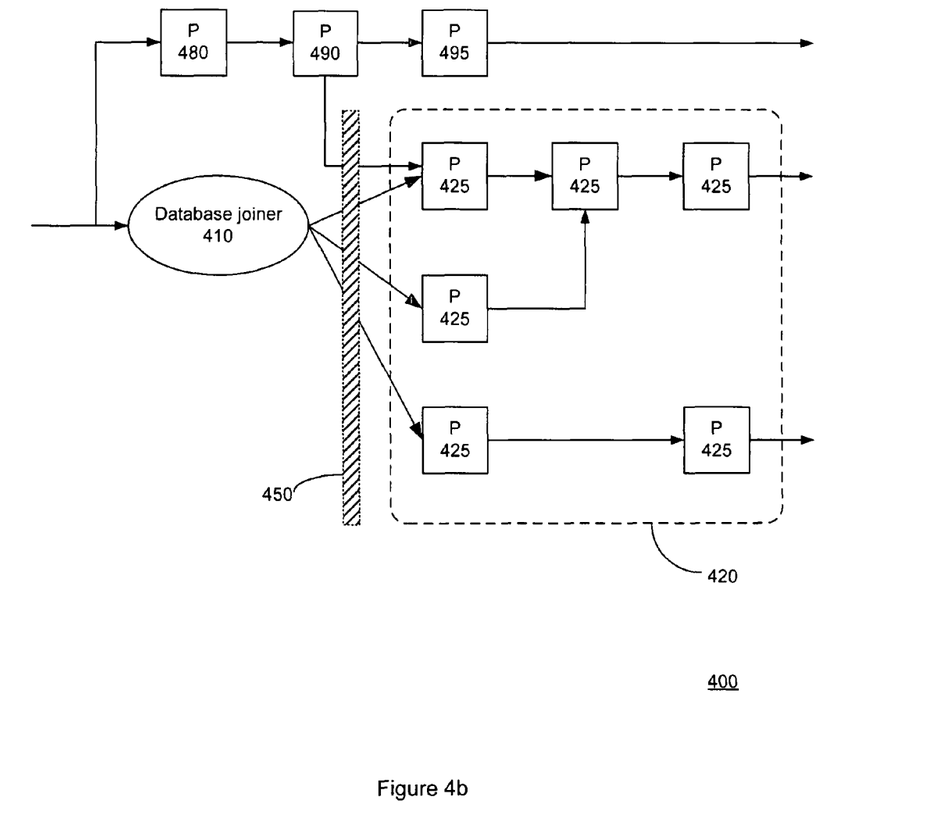

In the execution graph in FIG. 4b, the output of primitive 490 is an input to the timezone 420. The compiler places a synchronizer 450 across all inputs to the timezone (namely, the outputs of database joiner 410 and the output of primitive 490). The use of timezone 420 enables database joiner 410 and primitives 480, 490, and 495 to still process messages in parallel (such as messages with different internal timestamps), while protecting primitives 425 from such parallel processing, as parallel processing could cause such primitives 425 to process messages out of order due to delays associated with database joiner 410. Timezone 420 and synchronizer 450 enable database joiner 410 to make concurrent calls to the database (instead of serial calls) without disturbing the order in which messages downstream of database joiner 410 are processed.

If a primitive with potential for substantial delay is within a loop, the compiler designates such primitive and all primitives downstream of such primitive as a timezone (step 350). This differs from the non-loop scenario (steps 330-340) in that the timezone includes the potentially-delayed primitive. The compiler then identifies all inputs to the timezone (step 360) and places a synchronizer across all inputs to the timezone, where the synchronizer controls when messages on such inputs enter the timezone to ensure that messages that need to be processed together enter the timezone at the same time (step 370). The synchronizer does not let additional messages into the timezone until the previously-entered messages have been processed by the primitives in the timezone.

Figure 4C:
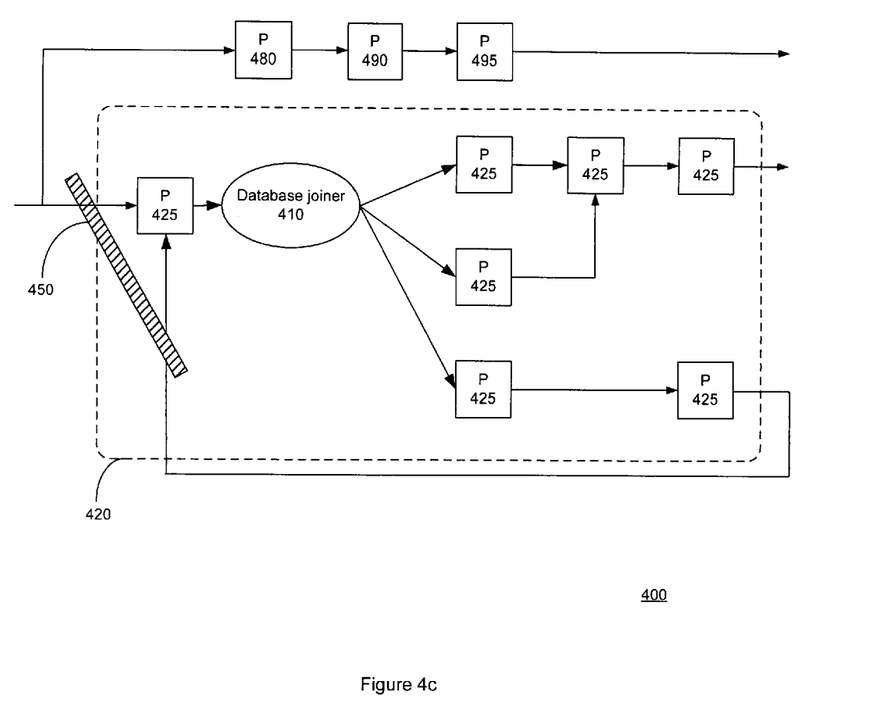
Figure 4D:
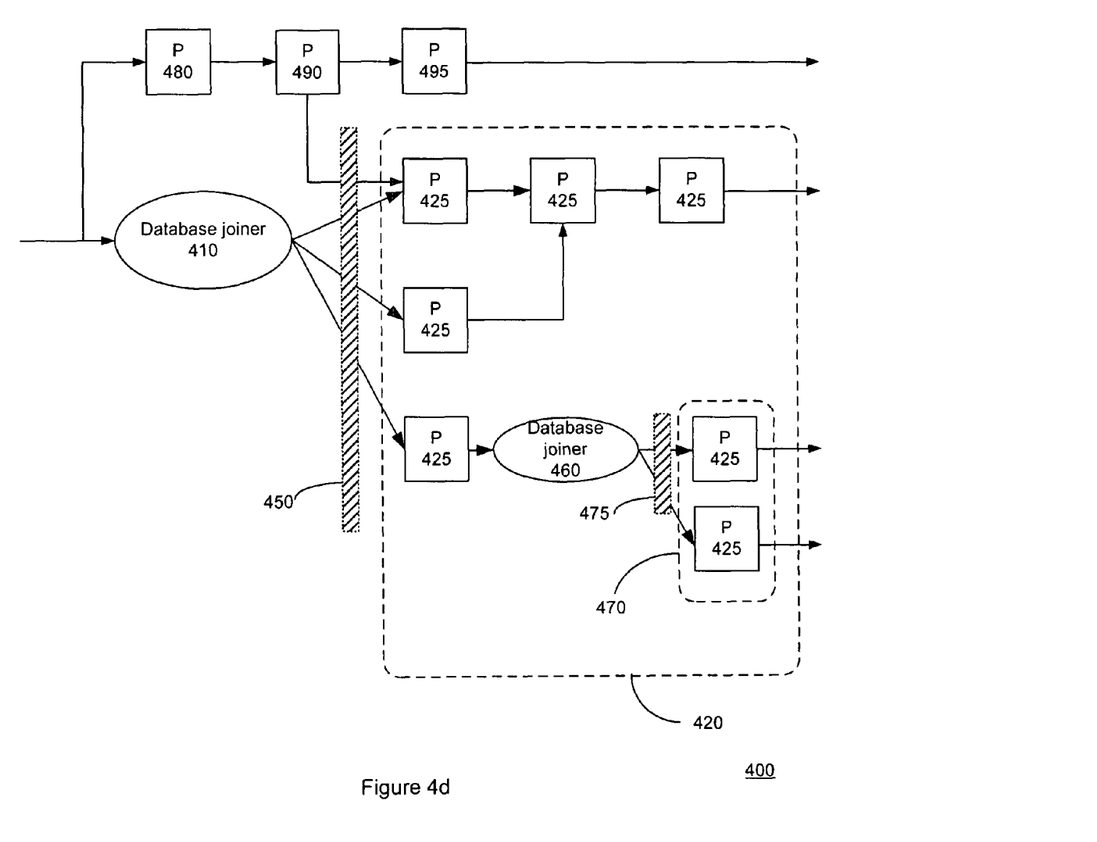

In the example execution graph in FIG. 4c, database joiner 410 is a primitive with potential for substantial delay. Since database joiner 410 is part of a loop, timezone 420 includes database joiner 410, as well as all primitives 425 downstream of database joiner 410. Synchronizer 450 is placed across all inputs to the timezone 420.

In one embodiment, the synchronizer relies on the internal timestamp (not the server clock time) of messages to determine which messages go into the timezone at a particular time. In such embodiment, this means that messages with the same timestamp go into the timezone at the same time, and messages with the next timestamp are not allowed into the timezone until messages with the previous timestamp have been processed in the timezone.

In an alternate embodiment, incoming messages are divided into "time slices." A time slice is a set of messages that have the same time slice and that are processed together. In this embodiment, the synchronizer ensures that messages with the same time slice enter the timezone at the same time. Only one time slice is allowed in the timezone at a time. Time slices are described in more detail in U.S. patent application Ser. No. 11/787,912, filed on Apr. 18, 2007 with inventors Aleksey Sanin, Mark Tsimelzon, Ian D. Marshall, and Robert B. Hagmann and titled "Method for Obtaining Repeatable and Predicable Output Results in a Continuous Processing System," the contents of which are incorporated by reference as if fully described herein.

Steps 320-340 or steps 350-370, whichever is applicable, are performed for each primitive in the graph with potential for substantial delay. Timezones can be nested within other timezones. For example, in FIG. 4d, the execution graph 400 includes a database joiner 460 that is downstream of database joiner 410. Timezone 470 is associated with database joiner 460 and is nested within timezone 420. A synchronizer 475 is placed across all inputs to timezone 470.

The use of timezones allows certain areas of the execution graph (i.e., areas outside the timezone) to process messages with different timestamps concurrently, while protecting other areas of the graph from processing messages out of order due to primitives with potential for substantial delay. This is especially useful in cases where it desirable for a database joiner primitive (that is not in a loop) to make concurrent calls to a database for multiple joins while still maintaining the proper order in which messages downstream of the database joiner 410 should be processed.

As will be understood by those familiar with the art, the invention may be embodied in other specific forms without departing from the spirit or essential characteristics thereof. Accordingly, the above disclosure of the present invention is intended to be illustrative and not limiting of the invention.

The invention claimed is:

1. A computer-implemented method for synchronizing a processing of messages in a continuous processing system, where the messages are pushed through a directed execution graph that comprises a set of connected primitives, the method comprising:

identifying a first primitive of the directed execution graph that causes a delay when executed, wherein a processing of the messages by the first primitive in parallel with a processing of the messages by one or more other primitives of the directed execution graph causes the messages to be processed out of order, the first primitive corresponding to a query statement in a module of the continuous processing system;

determining that the first primitive receives a message to be processed by one or more processors in accordance with the query statement, wherein incoming messages to the continuous processing system are assigned a timestamp and divided into time slices, and wherein messages within a time slice have a same timestamp and are processed in parallel;

designating one or more second primitives downstream of the identified first primitive in the set of connected primitives as first timezone based on the identified first primitive, the designated first timezone receiving as a first input the processed message from the first primitive, wherein a processing of one or more second primitives in a first timezone prevents the messages from being processed out of order by the one or more other primitives, identifying one or more second inputs to the first timezone that are in addition to the first input from the first primitive, the one or more second inputs including subsequent messages to be processed in the continuous processing system; and synchronizing the first input and the one or more second inputs to the first timezone, wherein the messages in the plurality of messages that need to be processed in parallel enter the first timezone concurrently, and wherein a parallel processing of messages with different internal timestamps does not occur within the first timezone, wherein the identifying of primitives, the designating, the identifying of inputs, and the synchronizing are performed by the one or more processors in the continuous processing system, including providing in an iterative manner at least one second timezone within the first timezone for at least another primitive in the first timezone when the at least one second primitive being executed causes delays.

2. The method of claim 1, wherein the synchronizing comprises:

synchronizing a flow of messages into the first timezone wherein messages having a same timestamp need to be processed in parallel and enter the first timezone concurrently.

3. The method of claim 1, wherein the continuous processing system processes messages in accordance with one or more ordering rules.

4. The method of claim 3, wherein one such ordering rule is that messages are processed in accordance with timestamps associated with the messages.

5. The method of claim 1, wherein the first primitive with the delay is a database joiner primitive.

6. The method of claim 1, wherein the first primitive with the delay is a remote procedure call primitive.

7. The method of claim 1, wherein the first primitive with the delay is a user-defined function that requires additional time to process.

8. The method of claim 1, wherein the continuous processing system processes messages concurrently.

9. The method of claim 1, wherein timezones are nested within other timezones.

10. The method of claim 1, wherein the method is applied iteratively to nest timezones within timezones.

11. The method of claim 1, further comprising:

identifying a second primitive in the first timezone that causes a delay when executed, wherein a processing of the messages by the second primitive in parallel with a processing of the messages by one or more other primitives of the directed execution graph causes the messages to be processed out of order;

designating one or more third primitives downstream of the identified second primitive in the set of connected primitives as a second timezone within the first timezone, wherein an output of the second primitive is an input to the second timezone;

identifying other inputs to the second timezone that are in addition to the input from the second primitive; and synchronizing the input from the second primitive and the identified other inputs to the second timezone, wherein the messages that need to be processed in parallel enter the second timezone concurrently.

12. A computer-implemented method for synchronizing a processing of messages in a continuous processing system, where the messages are pushed through a directed execution graph that comprises a set of connected primitives, the method comprising:

identifying a first primitive of the directed execution graph that causes a delay when executed, wherein a processing of the messages by the first primitive in parallel with a processing of the messages by one or more other primitives of the directed execution graph causes the messages to be processed out of order, the first primitive corresponding to a query statement in a module of the continuous processing system;

determining that the first primitive receives a message to be processed by one or more processors in accordance with the query statement, wherein incoming messages to the continuous processing system are assigned a timestamp and divided into time slices, and wherein messages within a time slice have a same timestamp and are thus processed in parallel;

determining whether the first primitive is within a loop;

designating one or more second primitives downstream of the first primitive in the set of connected primitives as a first timezone when the first primitive is determined not to be within the loop, wherein the output of the first primitive is a first input to the first timezone, wherein a processing of one or more second primitives in a first timezone prevents the messages from being processed out of order by the one or more other primitives;

identifying one or more second inputs to the first timezone that are in addition to the first input from the first primitive, the one or more second inputs including subsequent messages to be processed in the continuous processing system;

synchronizing the first input and the one or more second inputs to the first timezone, wherein the first and the one or more second messages that need to be processed in parallel enter the first timezone concurrently, and wherein a parallel processing of messages with different internal timestamps does not occur within the first timezone;

designating the first primitive and the one or more second primitives downstream of the first primitive as a second timezone when the first primitive is determined to be within the loop;

identifying inputs to the second timezone; and synchronizing the inputs to the second timezone, wherein the messages that need to be processed in parallel enter the second timezone concurrently and subsequent messages do not enter the second timezone until previously-entered messages have been processed in the second timezone, wherein the identifying of primitives, the determining, the designating of primitives, the identifying of inputs, and the synchronizing are performed by the one or more processors in the continuous processing system, including providing in an iterative manner at least one second timezone within the first timezone for at least another primitive in the first timezone when the at least one second primitive being executed causes delays.

13. A computer-implemented system for synchronizing the processing of messages in a continuous processing system, where messages are pushed through a directed execution graph that comprises a set of connected primitives, the system comprising:

a memory;
one or more processors;
a compiler configured to
identify a first primitive of the directed execution graph that causes a delay when executed, wherein a processing of the messages by the first primitive in parallel with a processing of the messages by one or more other primitives of the directed execution graph causes the messages to be processed out of order, assign a timestamp to incoming messages in the continuous processing system, divide the incoming messages into time slices, wherein messages within a time slice have a same timestamp and are processed in parallel, determine that the first primitive corresponds to a query statement in a module of the continuous processing system, wherein the first primitive receives a message to be processed by the one or more processors in accordance with the query statement, designate one or more second primitives downstream of the first primitive as a first timezone based on the identified first primitive, the designated first timezone receiving as a first input the processed first message from the first primitive, wherein a processing of one or more second primitives in a first timezone prevents the messages from being processed out of order by the one or more other primitives, and identify one or more second inputs to the first timezone that are in addition to the first input from the first primitive; and a synchronizer configured to synchronize the first input and the one or more second inputs to the first timezone, wherein the messages that need to be processed in parallel enter the first timezone concurrently, wherein the synchronizer is placed across all inputs to the first timezone, wherein a parallel processing of messages with different internal timestamps does not occur within the first timezone, and wherein at least one second timezone is provided, in an iterative manner, within the first timezone for at least one second primitive in the first timezone when the at least another primitive being executed causes delays, and wherein the compiler and the synchronizer are implemented using the one or more processors.

14. The system of claim 13, wherein the synchronizer is configured to synchronize a flow of messages into the first timezone, wherein the messages having a same timestamp are processed in parallel and enter the first timezone concurrently.

15. The system of claim 13, wherein the continuous processing system processes messages in accordance with one or more ordering rules.

16. The system of claim 15, wherein one such ordering rule is that messages are processed in accordance with timestamps associated with the messages.

17. The system of claim 13, wherein the first primitive with the delay is a database joiner primitive.

18. The system of claim 13, wherein the first primitive with the delay is a remote procedure call primitive.

19. The system of claim 13, wherein the first primitive with the delay is a user-defined function that requires additional time to process.

20. The system of claim 13, wherein the continuous processing system processes messages concurrently.

21. The system of claim 13, wherein the compiler is further configured to nest timezones within other timezones.

22. The system of claim 13, wherein the compiler is further configured to iteratively identify and designate primitives within the continuous processing system to nest timezones within timezones.

23. The system of claim 13,
wherein the compiler is further configured to
identify a second primitive in the first timezone that causes a delay when executed, wherein a processing of the messages by the second primitive in parallel with a processing of the messages by one or more other primitives of the directed execution graph causes the messages to be processed out of order,
designate one or more third primitives downstream of the identified second primitive in the set of connected primitives as a second timezone within the first timezone, wherein an output of the second primitive is an input to the second timezone, and
identify other inputs to the second timezone that are in addition to the input from the second primitive; and
further comprising:
a second synchronizer configured to synchronize the input from the second primitive and the identified other inputs to the second timezone, wherein the messages that need to be processed in parallel enter the second timezone concurrently, wherein the second synchronizer is placed across all inputs to the second timezone.

24. A computer-implemented system for synchronizing a processing of messages in a continuous processing system, where the messages are pushed through a directed execution graph that comprises a set of connected primitives, the system comprising:
a memory;
one or more processors;
a compiler configured to:
identify a first primitive of the directed execution graph that causes a delay when executed, wherein a processing of the messages by the first primitive in parallel with a processing of the messages by one or more other primitives of the directed execution graph causes the messages to be processed out of order,
assign a timestamp to incoming messages in the continuous processing system,
divide the incoming messages into time slices, wherein messages within a time slice have a same timestamp and are processed in parallel, and
determine that the first primitive corresponding to a query statement in a module of the continuous processing system, wherein the first primitive receives a message to be processed by the one or more processors in accordance with the query statement, to determine whether the first primitive is within a loop,
designate one or more second primitives downstream of the first primitive in the set of connected primitives as a first timezone when the first primitive is determined not to be within the loop, wherein the output of the first primitive is a first input to the first timezone to identify one or more second inputs to the first timezone that are in addition to the first input from the first primitive, the one or more second inputs including subsequent messages to be processed in the continuous processing system, wherein a processing of one or more second primitives in a first timezone prevents the messages from being processed out of order by the one or more other primitives,
designate the first primitive and the one or more second primitives downstream of the first primitive as a second timezone when the first primitive is determined to be within the loop, and
identify inputs to the second timezone;
a first synchronizer configured to synchronize the first input and the one or more second inputs to the first timezone so as to ensure that messages that need to be processed in parallel enter the first timezone concurrently, and wherein a parallel processing of messages with different internal timestamps does not occur within the first timezone; and
a second synchronizer configured to synchronize all inputs to the second timezone so as to ensure that messages that need to be processed in parallel enter the second timezone concurrently and subsequent messages do not enter the second timezone until previously-entered messages have been processed in the second timezone,
wherein at least one second timezone is provided, in an iterative manner, within the first timezone for at least one second primitive in the first timezone when the at least another primitive being executed causes delays, and
wherein the compiler and the first and second synchronizers are implemented using the one or more processors.

25. The system of claim 24, wherein the first and second synchronizers are configured to synchronize a flow of messages into the respective first and second timezones, wherein the messages having a same timestamp enter the first and second timezones concurrently.

26. The system of claim 24, wherein the continuous processing system processes messages in accordance with one or more ordering rules.

27. The system of claim 26, wherein one such ordering rule is that messages are processed in accordance with timestamps associated with the messages.

28. The system of claim 24, wherein the first primitive with the delay is a database joiner primitive.

29. The system of claim 24, wherein the first primitive with the delay is a remote procedure call primitive.

30. The system of claim 24, wherein the first primitive with the delay is a user-defined function that requires additional time to process.

31. The system of claim 24, wherein the continuous processing system processes messages concurrently.

32. The system of claim 24, wherein the compiler is further configured to nest timezones within other timezones.

33. The system of claim 24, wherein the compiler is further configured to iteratively identify and designate primitives within the continuous processing system to nest timezones within timezones.

* * * * *